Aug. 8, 1967  B. G. BJORNSEN  3,334,641
FLUID STREAM CONTROL APPARATUS
Filed June 26, 1964  2 Sheets-Sheet 1
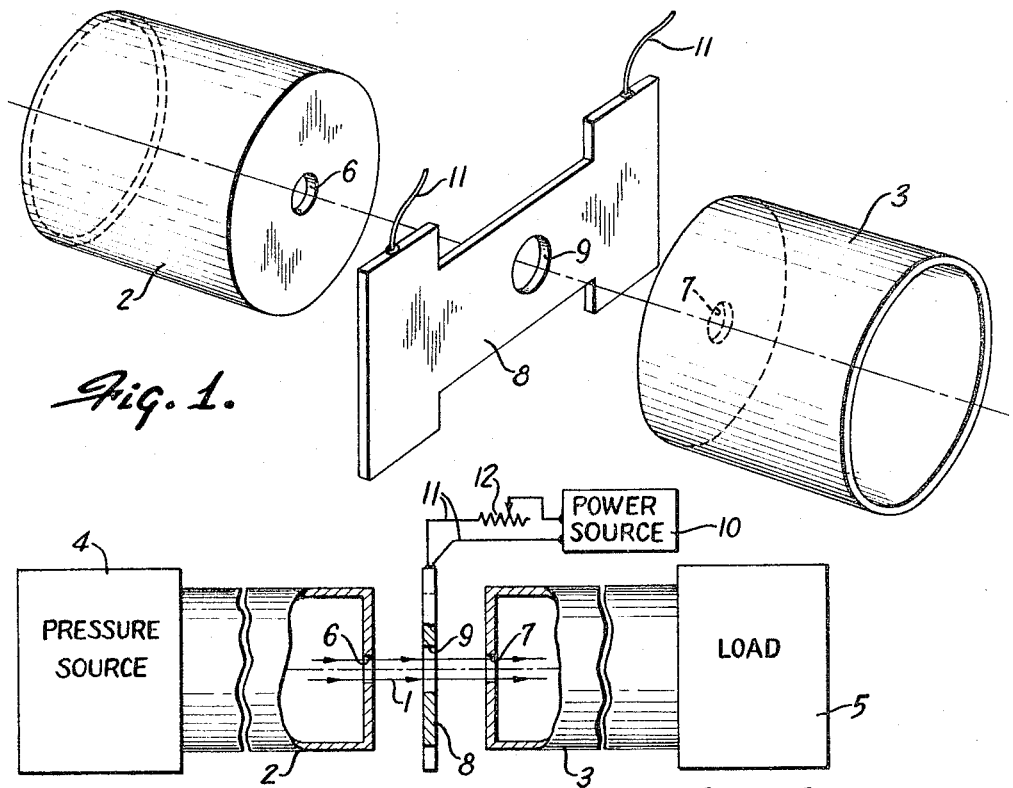
Fig. 1.
Fig. 2.
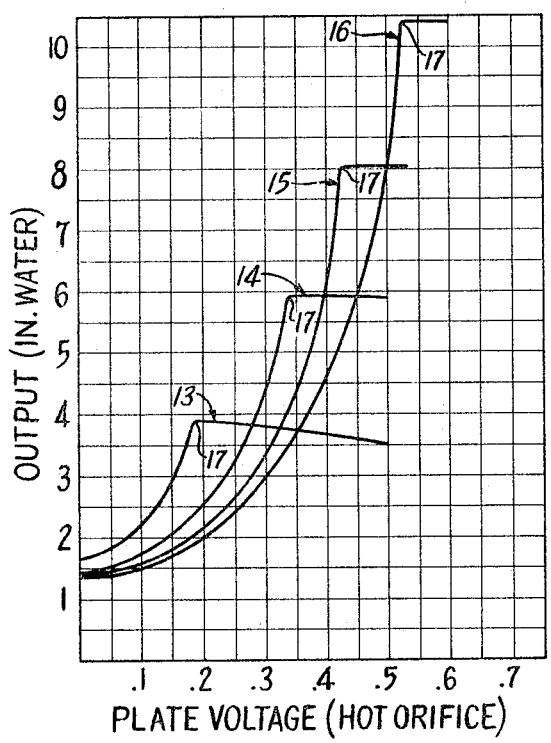
Fig. 3.
INVENTOR.
BJORN G. BJORNSEN
BY
Andrus & Starke
ATTORNEYS Aug. 8, 1967   B. G. BJORNSEN   3,334,641

FLUID STREAM CONTROL APPARATUS

Filed June 26, 1964   2 Sheets-Sheet 2

INVENTOR.
BJORN G. BJORNSEN
BY
*Andrus & Starke*
ATTORNEYS

United States Patent Office 3,334,641
Patented Aug. 8, 1967

3,334,641
FLUID STREAM CONTROL APPARATUS
Bjorn G. Bjornsen, Milwaukee, Wis., assignor to Johnson Service Company, Milwaukee, Wis., a corporation of Wisconsin
Filed June 26, 1964, Ser. No. 378,361
6 Claims. (Cl. 137—81.5)

This invention relates to a fluid stream control apparatus and particularly to apparatus for directly controlling a fluid signal in accordance with a thermal, acoustical or similar condition or signal without the conventional mechanically moving parts.

In pneumatic control systems, the output may be controlled in accordance with a thermal or acoustical signal or some other similar signal readily and accurately converted to a thermal or acoustical signal. Generally, the transduction from the thermal signal to the fluid output signal has employed mechanical and electromechanical devices to produce a mechanical movement proportional to the input thermal energy. This resulting mechanical movement is in turn interconnected to the fluid source to provide a corresponding variation in the pressure or power of the fluid. Thus, temperature sensitive metal strips or the like can be supplied with thermal energy by an electrical heating coil or other thermal sources. The metal strip moves from a set condition in accordance with the thermal input. The metal strip may then be connected as a baffle to a fluid control nozzle such that nozzle back pressure becomes a function of the changing fluid impedance due to baffle movement. Similarly, the heating of a liquid filled member has been employed to provide proportional mechanical movement of a diaphragm or the like which in turn controls a pneumatic or fluid signal. However, all such devices have the inherent difficulties and disadvantages accompanying the interposition of a mechanical device between the thermal and a fluid signal. Such devices, for example, inherently have substantial conversion losses and the complexity of such devices substantially limits their compactness and size.

The present invention is particularly directed to a method and apparatus for directly controlling the mechanical and kinetic energy of a continuous fluid stream by means of non-fluid control energy, such as thermal, acoustical or the like, and without interposition of auxiliary mechanically moving parts. For purposes of clarity of discussion, the invention is described hereinafter as applied to a thermal control system although sound, light and similar energy sources may be employed within the broadest aspect of this invention.

Generally, in accordance with the present invention, the fluid jet or stream passes a novel transducer or energy exchange member, preferably an orifice in an exchange plate, as a continuous stream flow which actuates a fluid receiving means responsive to the kinetic energy of the stream. During stream transmission, the thermal energy in the plate is exchanged between the member and the fluid stream to modulate the strength of the stream. The exchange appears to primarily occur between the orifice wall and the boundary layer of the stream in a manner to change the displacement and momentum flux thickness within the orifice. This change will be reflected in the average total head and/or momentum flux in the re-emitted stream.

The present invention preferably takes the form of an emitting orifice connected to a pressurized fluid source and a spaced collector means having a collecting orifice substantially aligned with the emitting orifice to provide a fluid stream therebetween with a thermal exchange plate disposed intermediate the emitter and the collector. The plate may be heated or cooled to provide a thermal energy source mounted in transforming relation to the stream. The kinetic energy of the stream to the collector side of the plate will be directly dependent on the thermal energy transfer between the plate and the stream as it flows through the control or thermal controlling orifice.

The present invention provides a fluid stream control without the necessity of interpositioning of mechanically moving devices and of a very compact construction. This stream control eliminates the difficulties of prior mechanical type controls and produces a very efficient conversion of the control energy to the fluid signal stream. Although the present invention has wide application and can be employed to control the output of any fluid stream, it is particularly adapted for incorporation in a pure fluid control signal amplifier and like systems.

The drawings furnished herewith illustrate the best mode presently contemplated for carrying out the invention and clearly indicate the several advantages heretofore discussed as well as other advantages which will be obvious to those skilled in the art.

In the drawings:

FIG. 1 is a perspective diagrammatic view illustrating the principles of the present invention;

FIG. 2 is a vertical section through the unit shown in FIG. 1;

FIG. 3 is a set of curves each showing output stream pressure changes with nozzle temperature changes;

Figure 4:
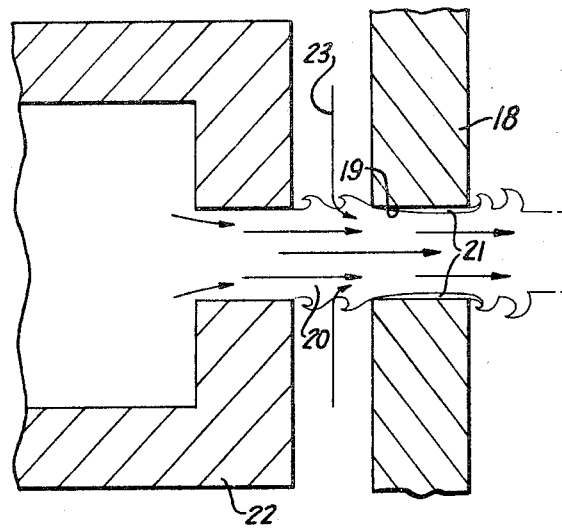
FIG. 4 is a diagrammatic illustration of a nozzle having a control orifice and a stream with similar diameters.

Referring to the drawings and particularly to FIGS. 1 and 2, a fluid stream 1 is shown flowing between an emitter nozzle 2 and a collector nozzle 3 which are mounted in predetermined spaced relation to provide a flow gap therebetween. The stream is formed by a pressure source 4 connected to the emitter nozzle 2. A fluid responsive load 5 is connected to the output side of the collector nozzle 3 for operation in accordance with the pressure or flow of the collected stream.

The emitter nozzle 2 includes an emitting orifice 6 determining the size of the fluid stream 1. A similarly sized collecting orifice 7 is provided in the collector nozzle 3 aligned with the emitting orifice 6.

Intermediate the nozzles 2 and 3, a control plate 8 is mounted in a plane substantially perpendicular to the axis of the fluid stream 1. The plate 8 includes a control or energy transfer orifice 9 aligned with the stream 1 and shown somewhat larger than the diameter of the stream to allow generally unimpeded movement of the stream therethrough.

A source of kinetic energy, such as heat or acoustical means, is connected to the plate 8 which directly transfers the kinetic energy from the orifice 9 to the adjacent streams to correspondingly change the kinetic energy of the stream. As a result, the strength or momentum flux of the output stream at the collector orifice 6 is dependent upon the energy in the plate 8 and, if the energy level changes, the stream strength is correspondingly modulated.

In the illustrated embodiment of the invention, an electrical power source 10 is connected by leads 11 to the opposite ends of the plate 8 and establishes a current flow through the plate and particularly about the control or transfer orifice 9. A current control potentiometer 12 is shown connected in the one lead 11 for adjusting the voltage applied across the plate 8 and thereby controlling the current flow through the plate.

In operation, as the stream 1 passes through the orifice 9, it is effectively intercepted at the incoming side without physical interruption of the flow. However, as the stream passes through the orifice 9, thermal energy transformation occurs between the heated plate 8 and the stream 1 and directly affects the strength of the output stream collected at the collecting orifice 7.

Referring particularly to FIG. 3, a set of four curves 13, 14, 15 and 16 is shown each having the output pressure, in inches of water, plotted on the vertical axis and the plate voltage, in tenths of volts, applied to the heated plate plotted on the horizontal axis. The four curves respectively correspond to the input pressures, in inches of water, of 10, 15, 20 and 25 inches. In obtaining the curves, an air stream 1 was established, the orifices 6 and 7 had a diameter of essentially .010 inch and were spaced essentially .295 inch apart. The heated orifice 9 was slightly larger than the orifices 6 and 7 to allow unimpeded movement of the stream other than for the energy transfer.

Referring to the curves, they essentially provide a similar output pressure in the absence of any thermal input at the plate 8. As the voltage is increased on the plate 8 to establish increasing current flow, the output pressures increase to a sharp knee or point 17 after which they are substantially horizontal. After the sharp knee 17, and particularly at the lower input pressures, the curve reversed in a direction slightly with the decrease substantially eliminated at the higher supply pressures. The sharp knee of the curve and the relatively linear portion of the curve adjacent the knee permits switching action of a thermal device.

The curve illustrates the characteristic of a constant supply pressure and clearly shows the output pressure varying directly with the heating effect to a predetermined level. By proper selection of the input supply pressure and the geometry of the orifices and their spacing, the output control signal may be directly controlled by a thermal signal without the necessity of any intermediate mechanical devices.

In the illustrated embodiment of the invention where the plate 8 is heated, heat energy is transferred to the 1 stream in accordance with the relative thermal energy of the plate and stream and increases the kinetic energy of the stream at the collector, as clearly illustrated by FIG. 3. The variation in the kinetic energy of the stream to the outlet side of orifice 9 resulting from the energy interchange may be detected or measured as a change in the average head as well as the momentum flux or force.

A theoretical explanation of the energy transfer and conversion may also involve a resulting change in the stream viscosity as a result of the addition of thermal energy and therefore the fluid resistance of the stream with the surrounding fluid, particularly in the fluid boundary layer in the orifice 9. The latter action can be further related upon the established relationship in which the Reynolds number of a stream changes inversely with the kinematic viscosity. The Reynolds number is directly related to the friction factor where a jet stream is considered to be analogous to fluid flow through a pipe having confining walls determined by the fluid boundaries between the jet stream and the surrounding fluid. As the temperature increases, the Reynolds number decreases in accordance with the change in the kinematic viscosity. There is therefore a reduced loss as a result of viscous friction between the stream and the surrounding ambient fluid and the like. The reduced loss is reflected in an increased kinematic energy of the fluid stream at the collector orifice 7 and as an increase in pressure and/or flow depending upon the load 5.

Where the stream is larger than or substantially corresponds to the diameter of the orifice, the interaction with the orifice wall appears to contribute to the functioning of the present invention. This action is described with the diagrammatic illustration in FIG. 4 of a control plate 18 having an orifice 19 through which a controlled stream 20 flows. The stream 20 to the entrance side of orifice 19 is slightly greater in diameter than the orifice 19. As a result, a shear loss is created between the jet stream and the orifice wall and the emitted power stream must be of a lesser strength by an amount directly related to the momentum flow loss created by the shear losses. The shear losses will be directly related to the fluid viscosity, and therefore the temperature, of the stream at the wall. Further, the shear stresses at the orifice wall create a boundary layer 21 within the orifice 19 which increases in thickness between the entrance and exit ends of the orifice. Further, this thickness is dependent on the viscosity of the stream. The boundary layer 21 is shown as a distinct outer portion of the stream 20 in FIG. 4. This distinct separation of the boundary layer and the unimpeded or free flow control core or layer is not physically present. However, the free flow central portion of the stream 20 is displaced from the wall due to a boundary layer phenomenon which thus has an effective thickness creating an effective exit opening at the exit end of the control orifice 19 which is smaller than the physical diameter of the orifice 19. The impedance of the control orifice 19 is directly related to the radius or diameter thereof and consequently, the thermal transducer can also be employed to adjust the flow impedance; for example, in combination with the input control system of the copending application of Bjorn G. Bjornsen and Thomas J. Lechner, entitled Input Fluid Control Apparatus, filed on Nov. 1, 1963, with Ser. No. 320,681 and assigned to a common assignee. As more fully disclosed therein, the main stream may be formed by a supply nozzle 22 spaced from the control orifice 19 and a fluid control signal 23 impressed across the main stream 20 to one side of a control orifice to directly control the strength of the main stream. The input impedance is at least in part controlled by the relative size of the control orifice 19 and the flow through the orifice.

Figure 5:
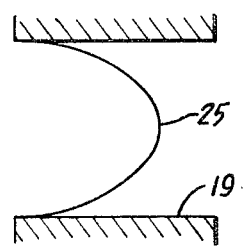
FIGS. 5–7 illustrate the changes in the velocity profile of a stream with temperature changes of a nozzle.
Figure 6:
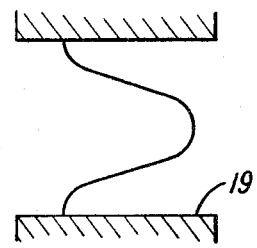
Figure 7:
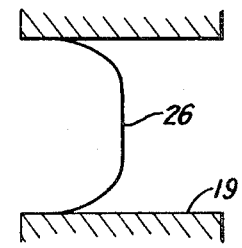

This boundary layer is diagrammatically shown in FIGS. 5–7 under the various general conditions. FIG. 5 illustrates isothermal flow having a parabolic temperature and velocity profile 24. FIG. 6 illustrates the results of heating orifice 19 such that heat flows into the stream 1 and causes a reduced and sharper temperature profile 25. The air adjacent the wall of orifice 19 is more viscous as a result of the transfer of kinetic energy into the stream and an increased or thicker boundary layer results. FIG. 7 illustrates a resulting temperature and velocity profile 26 when heat flows from the stream to the orifice such that the stream core is more viscous as a result of the loss of kinetic energy from the stream. The same general results apply to liquids and fluids in which the viscosity effect is such that it decreases with increasing temperature.

The collector of the present invention may be of any suitable kinetic energy responsive construction although the impacting stream concept shown and described in the copending application includes a stream collection means which is sensitive to changes in the momentum flux or strength of a stream and therefore particularly suitable for fluid control systems also employing the present invention.

Figure 8:
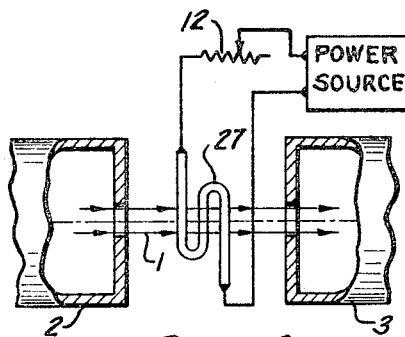
FIG. 8 is a view similar to FIG. 3 illustrating an alternative thermal control construction.

Although the orifice 9 has been shown within a plate 8, it may be otherwise defined by any suitable transfer member. For example, in FIG. 8, which is a view generally similar to FIG. 3, the plate 8 is replaced with a coil 27 of a suitable resistance wire. Coil 27 is shown as a single turn coil although a multiple turn coil may also be obviously employed. The internal coil diameter, or more particularly the circular area defined thereby, constitutes the orifice 9. The other elements of FIG. 8 generally correspond to that of FIGS. 1–3 and are similarly numbered. The embodiment of FIG. 8 will also function in the same general manner with strength of the stream 1 to the discharge side of coil 27 responsive to the direct kinetic energy interchange.

Figure 9:
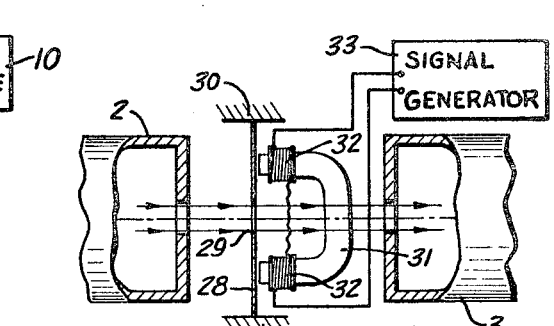
FIG. 9 is a view similar to FIGS. 3 and 8 illustrating an acoustical control construction.

Further, as previously noted, forms of kinetic energy sources other than thermal may also be employed. For example, FIG. 9 illustrates an acoustical or sound vibration control having a metallic membrane 28 having an orifice 29 mounted within suitable supports 30. A horseshoe magnet 31 is mounted in any suitable manner, not shown, with the pole ends adjacent the one face of the membrane 28. Suitable coils 32 encirle the pole ends and are connected to a signal generator 33 which generates an alternating or varying current in the coils 32. Coils 32 may be "voice" coils such as employed in a telephone receiver and superimpose a rapid changing magnetic flux upon the permanent flux of the horseshoe magnet 31 in accordance with energization of the coils. Membrane 28 is independently mounted and will move and vibrate in response to and in accordance with the rapid changing magnetic flux generated by the "voice" coils 32. This membrane vibration produces sound waves or energy which controls and modulates the strength of the stream through orifice 29. Although any frequency may be employed, generally the audible range and above appears to provide readily detectable control of a stream.

The acoustical energy impressed upon the plate or similar transfer element also provides a direct control of the kinetic energy of the stream. Although sound vibration does include actual movement of the orifice wall, it is clearly distinguished from the usual mechanical control device which relies on its position to control rather than its movement or rate of movement.

The control of a fluid stream of the present invention is substantially direct without the use of the more or less conventional baffle, diaphragm and similar converters or transducers and it may also provide an energy fluid impedance control means for a power stream.

Various modes of carrying out the invention are contemplated as being within the scope of the following claims particularly pointing out and distinctly claiming the subject matter which is regarded as the invention.

I claim:
1. A fluid stream control apparatus comprising:
    an emitter nozzle for emitting a fluid stream,
    a collector nozzle spaced from the emitter nozzle and arranged to receive the stream,
    orifice means having an orifice therein, said orifice means being located intermediate said emitter nozzle and collector nozzle and spaced from each nozzle, said orifice approximating the cross-sectional dimension of the fluid stream, said orifice means being thin in the direction of said stream relative to the thickness of the stream, and
    control means associated with said orifice means for establishing a selectively variable non-fluid kinetic field adjacent the fluid flowing through said orifice.
2. The structure of claim 1, wherein said control means includes a thermal source connected to the orifice means to establish thermal flow through the orifice means adjacent the orifice for transfer of thermal energy with respect to the stream as it flows through the orifice, the kinetic energy of the stream to the collector nozzle side of the orifice being proportional to the transfer of thermal energy whereby the stream energy at the collector is proportional to the transfer of thermal energy.
3. The stream control apparatus of claim 1 wherein the diameter of said control orifice is no greater than the diameter of the stream at the stream entrance to the control orifice.
4. The stream control apparatus of claim 1 wherein said thermal source includes electrical power means connected to establish a current flow through the plate.
5. The structure of claim 1, wherein said control means includes a source of acoustical energy coupled to the orifice means to provide corresponding vibration thereof and transfer of kinetic energy to the stream.
6. The structure of claim 1, wherein said orifice means includes a membrane having said orifice centrally thereof and aligned with the stream, said control means includes means coupled to the membrane to vibrate the membrane and generate kinetic energy in the form of acoustical waves for controlling the energy of the stream to the collector nozzle side of the orifice.

References Cited
UNITED STATES PATENTS

| | | | |
|---|---|---|---|
| 2,397,448 | 3/1946 | Todd | 137—83 |
| 2,906,849 | 9/1959 | Jensen | 236—84 X |
| 3,099,993 | 8/1963 | Smith | 137—13 |
| 3,144,037 | 8/1964 | Cargill | 137—81.5 |

ALAN COHAN, *Primary Examiner.*